Figure 1:
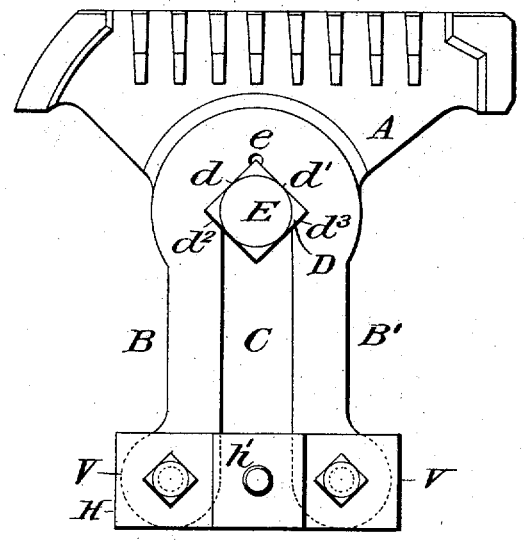

No. 11,725. Reissued Mar. 14, 1899.

J. REAGAN.

CHOPPER OR AGITATOR FOR SHAKING GRATES.

(Application filed Dec. 5, 1898.)

2 Sheets—Sheet 1.

Witnesses:
Grace R. Oakford.
Richard McElroy

Inventor.
James Reagan

THE NORRIS PETERS CO., PHOTO-LITHO., WASHINGTON, D. C.

No. 11,725. Reissued Mar. 14, 1899.

J. REAGAN.

CHOPPER OR AGITATOR FOR SHAKING GRATES.

(Application filed Dec. 5, 1898.)

2 Sheets—Sheet 2.

Witnesses.
Isaac R. Oakford.
Richard McElroy.

Inventor.
James Reagan

THE NORRIS PETERS CO., PHOTO-LITHO., WASHINGTON, D. C.

UNITED STATES PATENT OFFICE.

JAMES REAGAN, OF PHILADELPHIA, PENNSYLVANIA.

CHOPPER OR AGITATOR FOR SHAKING-GRATES.

SPECIFICATION forming part of Reissued Letters Patent No. 11,725, dated March 14, 1899.

Original No. 598,392, dated February 1, 1898. Application for reissue filed December 5, 1898. Serial No. 698,320½.

*To all whom it may concern:*

Be it known that I, JAMES REAGAN, of the city and county of Philadelphia, State of Pennsylvania, have invented certain new and useful Improvements in Choppers or Agitators for Shaking-Grates, of which the following is a specification, reference being had to the accompanying drawings, and to the letters of reference marked thereon.

My invention relates to shaking-grates for stationary, locomotive, or marine boilers, and more particularly to that form or construction of grate in which movable choppers are employed.

The object of my invention is to dispense with the fastening device consisting of split keys driven through openings in the depending lugs of the choppers to impinge the lower sides of the rocking shafts, as described and shown in prior patents granted to me December 8, 1891, No. 464,649, and August 18, 1896, No. 566,093, and substitute therefor a simple, economical, and effectual device whereby the choppers can be readily placed in position with the expenditure of a small amount of labor and time and in case one of them should become damaged while in the furnace it can readily, easily, and quickly be removed and a new one substituted without dismantling the grate or interfering with the fire to any great extent. This will be found of especial advantage in grates for furnaces of marine boilers, where the space to work in is limited and time is of great importance.

My invention consists in constructing the choppers or fuel-supporters similar to those described in my former patent, No. 464,649, with the difference that instead of having a recess to fit the rocking shafts each chopper or leaf is provided with a square transverse aperture through the center, said aperture having a small recess at its corner, and the shafts, which are square in cross-section, are set in the bearings across the side bars, so that their sides incline at an angle of forty-five degrees, forming quadrangular prisms, with the transverse aperture made of a corresponding form to fit over or span the sides. Thus, owing to the plain or flat surfaces coming in contact, the choppers or leaves are prevented from rotating on the supporting-shafts, but are permitted to oscillate in unison therewith. The chopper thus constructed is slipped over a certain part of the rocking shaft and moved laterally into position, simply necessitating the removal of one or more fire-bars in applying or removing the same.

Reference is had to the accompanying drawings, in which—

Figure 2:
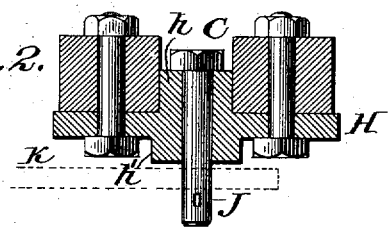
Figure 3:
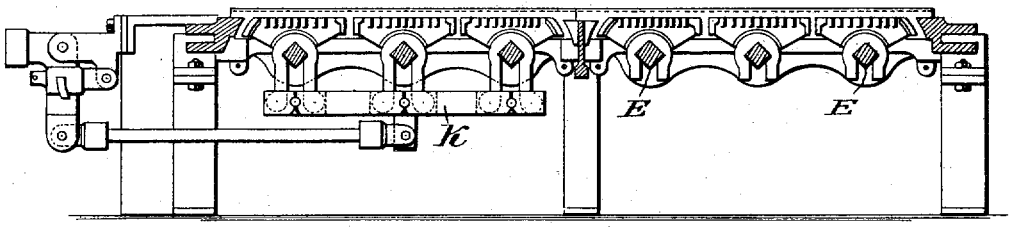
Figure 4:
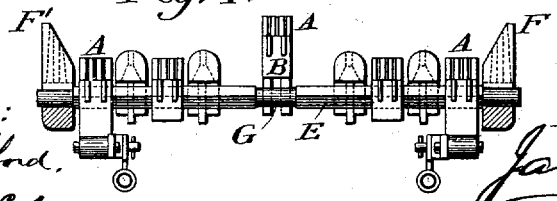
Figure 5:
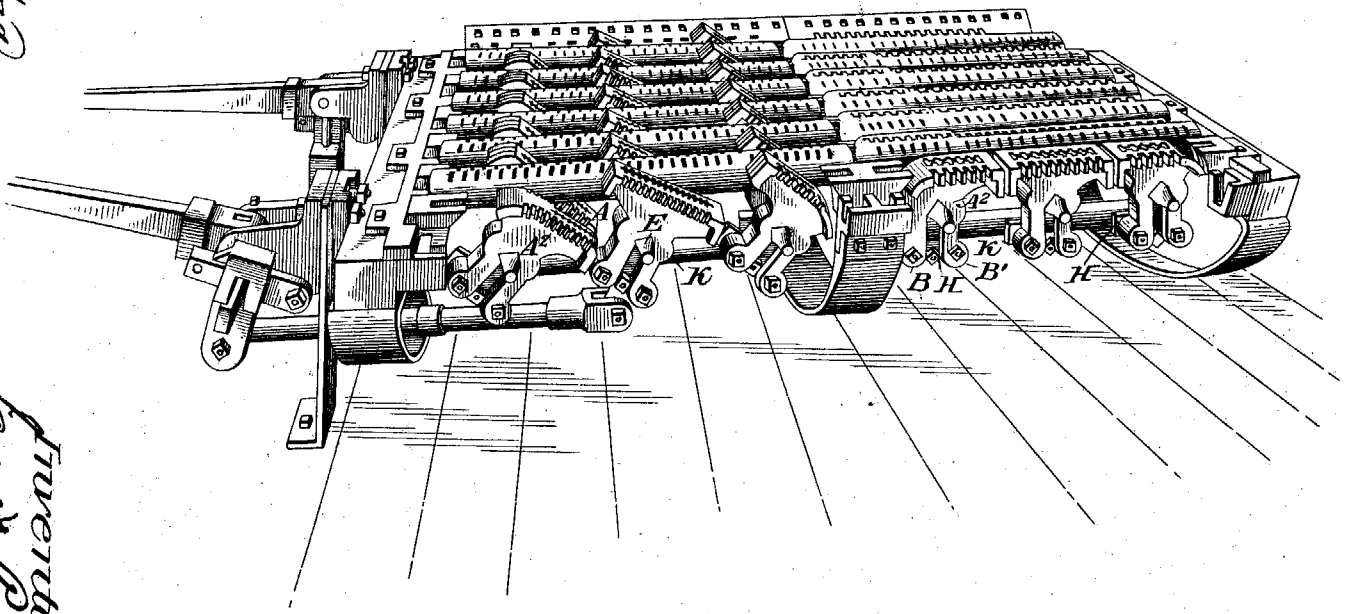

Figure 1 is a side view of a chopper or agitator embodying my improvement. Fig. 2 is a sectional plan view on the line V V of Fig. 1. Fig. 3 is a longitudinal section of a grate with apertured fire-bars extending parallel and choppers embodying my invention placed therebetween. Fig. 4 is a transverse section of the grate, showing the means of applying and removing the choppers to and from the angular rocking shafts. Fig. 5 is a perspective view of a shaking-grate for a marine-boiler furnace, showing my invention applied.

The side choppers A, Fig. 1, are provided with elongated lugs B B′, depending from the bottom thereof, with an intervening open space C, which communicates with an aperture D, made transversely through the center of the chopper to accommodate the angular rocking shaft E, upon which they are mounted.

The supporting-shafts E of all the choppers, set with inclined sides forming quadrangular prisms, require that the aperture D through each chopper be made of corresponding shape, the two upper sides $d$ $d'$ of which form tapering seats for the shaft, and the two lower edges $d^2$ $d^3$ on each side of the opening C form shoulders to impinge the lower sides of the shaft to prevent displacement, so that when the chopper is passed over the projecting angles of the shaft it will rest upon the upper faces of the same, and owing to the sides $d$ $d'$ of the aperture being inclined it will wedge itself in position, and the flat surfaces being in contact will prevent it rotating on the shaft. At the upper or converging point of the sides $d$ $d'$ a small recess $e$ is made to allow clearance for the sharp corner or salient angle of the shaft to avoid any possibility of the chopper riding on this point and to insure a perfect seating on the sides $d^2$ $d^3$.

The shafts or bars E, Figs. 3 and 4, have end journals, which drop into the bearings in the side bars F F′, and an intermediate short cylindrical portion or round spot G, over which are passed the depending lugs B B′ of the chopper.

The depending lugs B B′ of the side choppers, Figs. 1 and 2, to which are attached the bars for shaking and dumping, are made of sufficient length to obtain the proper leverage to manipulate the grate. Across the lower ends of these lugs is bolted a pivot-supporting plate H, which is made with an offset *h* on one side to enter the open space C and a similar offset *h′*, Fig. 2, on the opposite side to keep the pull-bar K clear of the choppers and also to lend additional support to the pivot-pin J, which passes through the center.

The shafts E, Fig. 3, which are square in cross-section, are set, as stated, across the grate with the sides inclined at an angle of forty-five degrees and are maintained in their position by means of the pull or tie bar K, which is coupled across the lower ends of the depending lugs.

In case one or more of the choppers should become damaged from any cause while under fire it or they can be readily removed by uncovering the fire and lifting out one or more fire-bars, as the case may be, and sliding the chopper along until it is opposite the round spot G on the shaft, at which point it is lifted out and a new one inserted, moved to its proper position, and the fire-bars replaced. In removing the choppers at the right and left side of the grate the pull-bars attached to the lugs will have to be disconnected.

What I claim, and desire to secure by Letters Patent, is—

1. The combination of a square shaft, and a removable chopper carried thereby, said chopper having an angular aperture corresponding to the form of the shaft and said aperture being provided with a small recess at its corner, so as to give clearance to the sharp corner of the shaft, substantially as described.

2. The combination of a square shaft, and a removable chopper carried thereby, said chopper having an angular aperture corresponding to the form of the shaft, and said aperture having a recess at one corner and a further recess at the diagonally opposite corner, so as to give clearance to opposite sharp corners of the shaft, substantially as described.

3. The combination of a square shaft E, and a removable chopper A, carried thereby, said chopper having an angular aperture, D, corresponding to the form of the shaft, the said aperture being provided with a recess *e*, at its upper corner, and with a further recess, C, at the diagonally opposite corner, the latter recess being the space between the downwardly-depending lugs B and B′, substantially as described.

4. A hollow chopper or leaf having a central angular aperture, D, corresponding to the form of the supporting-shaft, so as to maintain a vertical position without rotating on said shaft, and provided with elongated depending lugs, B B′, with an intervening space, C; in combination with the rocking shaft E, plate H, bolt J, and pull-bar K, for shaking and dumping the grate, substantially as specified.

In testimony whereof I have affixed my signature in the presence of two witnesses.

JAMES REAGAN.

Witnesses:
ROBERT OSBORNE, Jr.,
ISAAC R. OAKFORD.